(12) United States Patent
Astbury et al.

(10) Patent No.: US 12,315,643 B2
(45) Date of Patent: May 27, 2025

(54) LAYERED NEUTRON SHIELDING

(71) Applicant: Tokamak Energy Ltd, Abingdon (GB)

(72) Inventors: Jack Astbury, Abingdon (GB); Thomas Davis, Evesham (GB); Simon Middleburgh, Chester (GB)

(73) Assignee: Tokamak Energy Ltd, Abingdon (GB)

( * ) Notice: Subject to any disclaimer, the term of this patent is extended or adjusted under 35 U.S.C. 154(b) by 264 days.

(21) Appl. No.: 17/786,485

(22) PCT Filed: Dec. 15, 2020

(86) PCT No.: PCT/EP2020/086259
§ 371 (c)(1),
(2) Date: Jun. 16, 2022

(87) PCT Pub. No.: WO2021/122623
PCT Pub. Date: Jun. 24, 2021

(65) Prior Publication Data
US 2023/0025227 A1   Jan. 26, 2023

(30) Foreign Application Priority Data

Dec. 20, 2019 (GB) ...................................... 1919059
Sep. 23, 2020 (GB) ...................................... 2015029

(51) Int. Cl.
*G21B 1/05* (2006.01)
*G21F 1/08* (2006.01)

(52) U.S. Cl.
CPC ............... *G21B 1/057* (2013.01); *G21F 1/08* (2013.01)

(58) Field of Classification Search
CPC .. G21B 1/057; G21B 1/11; G21F 1/08; G21F 1/125; Y02E 30/10; H01F 6/06; H01F 27/363
See application file for complete search history.

(56) References Cited

U.S. PATENT DOCUMENTS

| 2016/0232988 A1 | 8/2016 | Sykes et al. |
| 2017/0186502 A1 | 6/2017 | Kingham et al. |
| 2019/0096536 A1 | 3/2019 | Arafat et al. |

FOREIGN PATENT DOCUMENTS

| CN | 102490913 A | 6/2012 |
| CN | 106489180 A | 3/2017 |
| CN | 106847354 A | 6/2017 |
| DE | 3327348 A1 | 2/1985 |
| GB | 2528272 A | 1/2016 |
| JP | S58156884 A | 9/1983 |
| JP | 2013024566 A | 2/2013 |

(Continued)

OTHER PUBLICATIONS

Windsor, et al., "Modelling the power deposition into a spherical tokamak fusion power plant," Nuclear Fusion, vol. 57, No. 3, 2017 (14 pages).

(Continued)

*Primary Examiner* — David E Smith
*Assistant Examiner* — Christopher J Gassen
(74) *Attorney, Agent, or Firm* — Michael Best & Friedrich LLP

(57) ABSTRACT

Neutron shielding. The neutron shielding comprises a plurality of absorption layers (201, 203), and at least one moderating layer (202). The plurality of absorption layers each comprise tungsten boride or tungsten carbide. The at least one moderating layer comprises a metal hydride. Each moderating layer is between at least two absorption layers.

14 Claims, 2 Drawing Sheets

(56) References Cited

FOREIGN PATENT DOCUMENTS

| JP | 2017524928 A | 8/2017 |
|----|--------------|--------|
| KR | 20180090539 A | 8/2018 |
| RU | 2442620 C2 | 2/2012 |
| TW | 200922990 A | 6/2009 |

OTHER PUBLICATIONS

Windsor, et al., "Neutron and gamma flux distributions and their implications for radiation damage in the shielded superconducting core of a fusion power plant," Nuclear Fusion, vol. 57, No. 11, 2017 (12 pages).
Windsor, et al., "Design of cemented tungsten carbide and boride-containing shields for a fusion power plant," Nuclear Fusion, vol. 58, No. 7, 2018 (13 pages).
International Search Report and Written Opinion for Application No. PCT/EP2020/086259 dated Apr. 19, 2021 (19 pages).
International Preliminary Report on Patentability for Application No. PCT/EP2020/086259 dated Nov. 18, 2021 (10 pages).
United Kingdom Intellectual Property Office Search Report for Application No. GB1919059.4 dated Jun. 19, 2020 (4 pages).
Taiwanese Patent Office Action for Application No. 109144504 dated May 14, 2024 (17 pages including English machine translation).
Japanese Patent Office Action for Application No. 2022537313 dated Jun. 18, 2024 (4 pages including English machine translation).
Humphry-Baker et al., Shielding materials in the compact spherical tokamak, Phil. Trans. R. Soc. A 377: 20170443, http://dx.doi.org/10.1098/rsta.2017.0443, 2019 (20 pages).
Windridge et al., Nuclear Fusion Research at Tokamak Energy Corporation, J. Plasma Fusion Res. vol. 93, No. 1, p. 28-31, 2017 (8 pages including English machine translation).
Chinese Patent Office Action for Application No. 202080088997.4 dated Mar. 10, 2025 (9 pages with English machine translation).

LAYERED NEUTRON SHIELDING

CROSS-REFERENCE TO RELATED APPLICATION(S)

This application is a national phase entry of PCT/EP2020/086259, filed on Dec. 15, 2020, which claims priority to GB 1919059.4, filed on Dec. 20, 2019 and GB 2015029.8, filed on Sep. 23, 2020, the entire contents of each of which are fully incorporated herein by reference.

FIELD OF THE INVENTION

The present invention relates to neutron shielding, particularly, though not exclusively, for use in tokamak fusion reactors.

BACKGROUND

The challenge of producing fusion power is hugely complex. Fusion neutrons are produced when a deuterium-tritium (D-T) or deuterium-deuterium (D-D) plasma are heated so that the nuclei have sufficient energy to overcome the Coulomb electrostatic repulsion to fuse together, releasing energetic neutrons and fusion products (e.g. $^4$He for D-T). To date, the most promising way of achieving this is to use a tokamak device; in the conventional tokamak approach to fusion (as embodied by ITER), the plasma needs to have high confinement time, high temperature, and high density to optimise this process.

A tokamak features a combination of strong toroidal magnetic field BT, high plasma current $I_p$ and usually a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

In order to ensure that the reactor is as compact as possible (which allows greater efficiency, particularly for a "spherical tokamak" plasma configuration), the thickness of radiation shielding should be reduced as much as possible, while still maintaining adequate protection for the other components. Minimising the distance between the plasma and the field coils allows a higher magnetic field in the plasma with a lower current in the coils.

FIG. 1 shows a section of the central column, and illustrates the problems which the shielding material must overcome. The central column comprises a central core of High Temperature Superconductor (HTS) coils 11 and an outer layer of shielding 12. Depending on the material used for the shielding, there may be a layer of oxidised shielding material 13 on the outer surface. There are three major causes of damage which originate from the plasma 14. Firstly, the high energy neutrons 15 generated by the fusion reaction can essentially knock atoms out of the structure of the shielding, creating damage cascades 16 which propagate through the material and degrade the materials properties (such as mechanical, thermal or superconducting properties). Secondly, the heat flux 17 from the fusion reaction is significant, and can damage the shielding due to thermal stresses induced by uneven heating and the HTS core, as higher temperatures reduces the current that can be carried while maintaining superconductivity, and can cause the coil to suddenly gain resistance, causing the magnet to quench. Lastly, the energetic particles of the plasma will ablate 18 the outer surface of the shielding. This not only causes damage to the shielding itself, but can also contaminate the plasma if the shielding is directly exposed to it. It is desirable to have a shielding material which can resist these effects, as well as prevent neutrons from reaching the superconducting coils.

Current shielding designs also often make use of water channels both for cooling the shield, and for moderating the neutrons (which increases the effectiveness of the shielding). However, this presents issues as the water is difficult to handle during disposal or maintenance of the application—due to the risks of pressured systems, contamination, activation and vaporisation of the water, and the possibility of water from the reactor getting into the environment if mishandled.

There is therefore a need for an effective neutron shield which does not require water for moderation.

SUMMARY

According to a first aspect, there is provided neutron shielding. The neutron shielding comprises a plurality of absorption layers, and at least one moderating layer. The plurality of absorption layers each comprise tungsten boride or tungsten carbide. The at least one moderating layer comprises a metal hydride. Each moderating layer is between at least two absorption layers.

According to a second aspect, there is provided neutron shielding. The neutron shielding comprises a metal hydride. The metal hydride comprises a neutron absorbing element which:
 has an average neutron absorption cross section which is greater than 0.1 barns at a neutron energy range between 0.02 and 0.03 eV; and
 has a solid solubility of at least 1 mol % with all other metals in the alloy.

The "average neutron absorption cross section" is an average of the neutron absorption cross sections in the specified range of all isotopes of that element present (weighted by their abundance). The distribution of isotopes of the neutron absorbing element may be their natural abundance, or it may be some other distribution with the required average neutron absorption cross section.

According to a third aspect, there is provided a tokamak nuclear fusion reactor. The reactor comprises a toroidal plasma chamber, a plasma confinement system, and neutron shielding. The plasma confinement system is arranged to generate a magnetic field for confining a plasma in an interior of the plasma chamber. The neutron shielding is neutron shielding according to the first or second aspect, and is arranged between the interior of the toroidal plasma chamber and the plasma confinement system.

Further embodiments are presented in claim 2 et seq.

DETAILED DESCRIPTION

Figure 1:
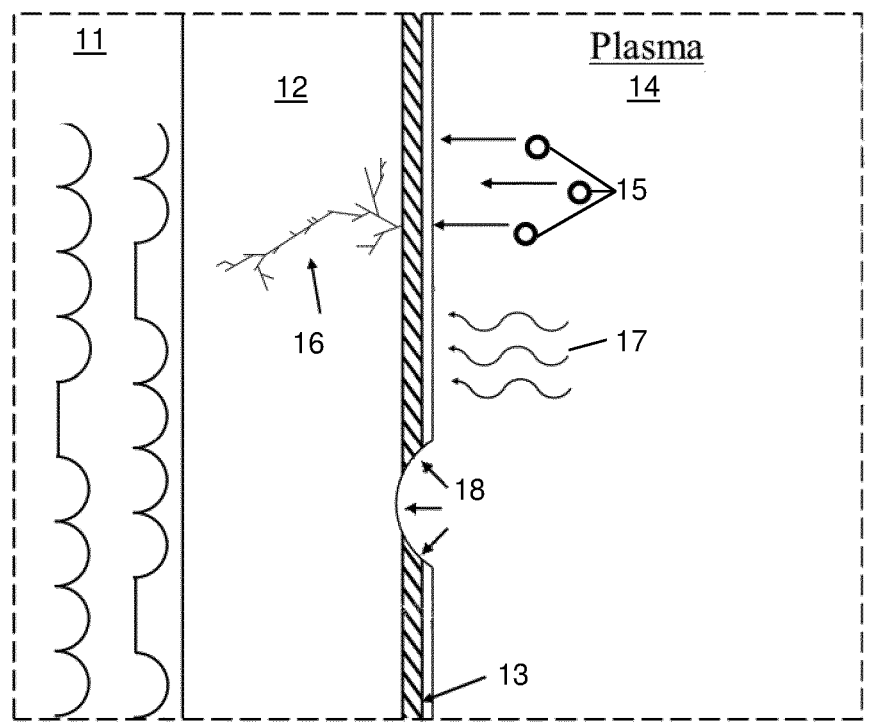
FIG. 1 illustrates the neutron shielding of a central column of a tokamak, and the design challenges of such.

An effective, compact radiation shield to reduce absorbed dose in sensitive materials originating from a high-energy neutron source (such as in the central column of a spherical tokamak) requires a combination of high Z (atomic mass) and low Z elements in bulk materials. High energy neutrons with kinetic energies greater than a few MeV are effectively moderated by two principal mechanisms: firstly through inelastic nuclear reactions with high Z nuclei, and secondly through elastic scattering with low Z nuclei. After inelastic scattering, the secondary neutron energies are typically below the reaction threshold energies for subsequent inelastic nuclear reactions with high Z elements and can therefore only be effectively moderated by low Z elements. A combination of high-Z and low-Z elements can therefore be used to reduce the high-energy neutron flux incident upon sensitive materials beyond the shield.

An effective high energy neutron shield requires four main sections, in order from the neutron source to the objects being protected:

A material containing elements with high atomic mass, to step down the neutrons energy from the plasma (especially a material with a high cross section for inelastic scatter or neutron multiplication reactions)

A neutron moderator (i.e. a material containing elements with a low atomic mass), to further moderate the neutrons to optimal cross section energies A neutron absorber, to absorb the moderated neutrons A gamma shield, to absorb gamma rays produced by neutron interactions in earlier stages.

Where a single material or composite material can perform multiple functions, e.g. as a neutron absorber and a gamma shield, then two or more sections may be combined.

In conventional shielding, the neutron moderator is often water—which requires careful handling for disposal and safety, as described above.

Tungsten is an ideal choice as the high-Z constituent element for the first stage owing to both its high Z number (74) and its typically high mass and number density in stable compounds as compared to other high-Z elements such as Lead. Tungsten borides are especially favourable for shielding applications since they add boron as a constituent element of the neutron shield; boron is an effective neutron absorber at low energies preventing low-energy neutrons from penetrating the shield. In addition, tungsten is an effective absorber of gamma radiation. As such, tungsten borides can act as all of the above sections, with the exception of the neutron moderator (as boron does not have a significant moderating effect compared to, e.g. hydrogen). Tungsten carbides are also favourable for shielding application because the carbon provides neutron energy moderation, albeit not as effective as e.g. hydrogen—as such they may be used for all of the above sections, but will generally be outperformed as moderators by hydrogen-containing materials, or as neutron absorbers by tungsten boride.

Hydrogen is the ideal neutron moderator below a few MeV, and is available as a constituent element of many potential materials. However, the most common, water and hydrocarbons, are problematic when integrated in to a fusion power plant. Metal hydrides are comparable in terms of hydrogen-density with water and hydrocarbons, but remain solid at temperatures substantially higher than the water or typical hydrocarbons at room pressure. This both allows for easier design of neutron shielding structures (as solid components are easier to integrate than liquid components), and results in easier maintenance and decommissioning (as there is lower risk of a leak of solid components).

Figure 2:
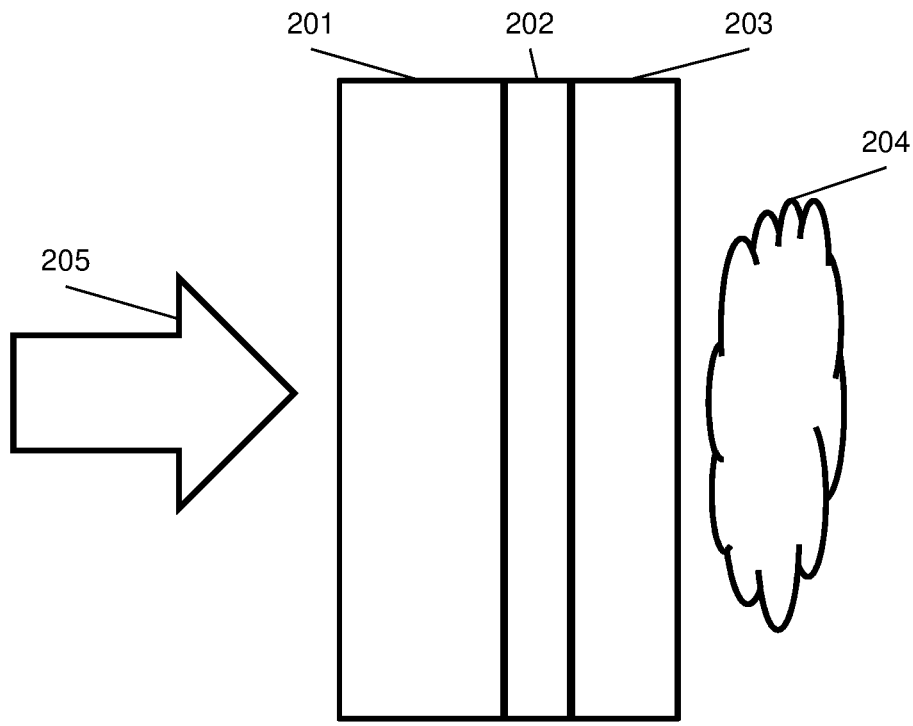
FIG. 2 is a schematic illustration of an exemplary neutron shield.

As such, a composite shield as shown in FIG. 2 that is a "sandwich" of tungsten boride and metal hydride, with two layers 201, 203 of tungsten boride and a layer 202 of metal hydride between them, is very effective as a neutron shield, for protecting sensitive components 204 from neutron irradiation 205. In fact, a multi-layer shield with alternating layers of tungsten boride (or tungsten carbide) and metal hydride, with tungsten boride (or tungsten carbide) as the radially outer layers, will generally be effective.

Tungsten boride may be provided in various forms, e.g. as a cemented tungsten boride (particles of tungsten boride in a metal matrix), sintered tungsten boride, or as an alloy with metallic tungsten and/or other elements, etc. Any of the tungsten boride compounds may be used, as required by the particular structural considerations of the shielding application. One promising approach is a two-phase structure of tungsten with $W_2B$, which can be formed in a known process involving vacuum hot-pressing pure tungsten with boron nitride, producing a material with useful thermal and mechanical properties.

Tungsten carbide may also be provided in various forms, e.g. as a cemented tungsten carbide (particles of tungsten carbide in a metal matrix) or as a ceramic-metal (cermet) tungsten carbide, reactively-sintered tungsten carbide/boride, or monolithic tungsten-carbide.

Potential metal hydrides for use as the moderator include lithium hydride ($LiH_x$), hafnium hydride ($HfH_x$), yttrium hydride ($YH_x$) and zirconium hydride ($ZrH_x$), or combinations thereof. In each case, the hydride has been identified with the chemical formula of the most common compound—but other hydrides (or combinations thereof, or alloys with the pure metal) may be used. The exact hydrogen-to-metal ratio x may be chosen based on the degree of moderation required, the structural properties required, and will generally be between 0.1 and 4, or between 1 and 2. A value of 1.33 was used in simulation testing of the neutron shielding.

Tungsten boride will generally comprise the majority of the shielding, with the total thickness of the tungsten boride layers being between 75% and 99% of the total thickness of tungsten boride and metal hydride, more particularly between 80% and 95% of the total thickness of tungsten boride and metal hydride. The tungsten boride layer 201 facing the neutron source (i.e. one of the outer tungsten boride layers) may be between 30% and 90% of the total thickness of tungsten boride and metal hydride, more particularly between 40% and 80% of the total thickness. Although layer 201 is depicted in FIG. 2 as a single layer, it may be constructed from multiple individual layers. One of the other tungsten boride layers (i.e. one where a metal hydride layer is between this layer and the neutron-facing layer, generally the final layer 203) may be at least 10% of the total thickness of tungsten boride and metal hydride. It will be appreciated that the upper limit of the thickness of the other tungsten boride layers is defined by the difference between the total thickness of tungsten boride and the thickness of tungsten boride in the neutron-facing layer.

In any of the above discussion, tungsten boride (WB) may be replaced by tungsten carbide (WC) or a combination of tungsten boride and tungsten carbide.

Structures with further $HfH_x$ and WB layers may also perform well—e.g with multiple $HfH_x$ layers each separated by WB or WC layers, and having WB or WC layers as the radially outer layers. Similar compositions would be expected to perform well for the other metal hydrides.

Simulations of layered WB—$HfH_x$—WB shielding (with x=1.33) provided shielding which was up to 5 times more effective (i.e. resulted in 5 times less energy deposition to underlying components) than a benchmark of tungsten carbide and water shielding of the same total thickness. Adjusting this for practically obtainable tungsten boride and hafnium hydride materials (rather than pure $HfH_x$ or the particular tungsten boride composition used in the simulation) gave similar results.

The tungsten boride or carbide layers may be formed from composite materials comprising tungsten boride or carbide—e.g. a cermet with tungsten boride or carbide particles in a metal matrix. Additionally, as discussed previously, the tungsten boride/carbide layer may contain a mixture of tungsten boride or carbide, which may be a composite material with some other material (e.g. a cermet having both tungsten boride and tungsten carbide as aggregates).

Similarly, the metal hydride layer or layers may be formed from composite materials comprising the metal hydride, e.g. a metal-clad metal hydride layer. The metal hydride layers may comprise hydrides of multiple metals in an alloy. This provides an advantage in that the thermal decomposition curve of the alloy hydride (i.e. the amount of hydrogen released from the material at temperature) will have a wider temperature profile, allowing any systems configured to absorb or remove the hydrogen produced as a result of the thermal decomposition to more easily accommodate the hydrogen. As an example, the metal hydride layers may contain any combination of metals known to form body-centred cubic solid solutions with each-other, for example those in groups 4, 5 and 6 of the periodic table (such as hafnium, niobium, tantalum, titanium, tungsten, and zirconium) and/or yttrium, gadolinium, beryllium, and uranium.

One possibility is to use a "high-entropy alloy"-like structure, which has several (e.g. at least 5) different metals, with atomic proportions (i.e. the number of atoms of that metal divided by the total number of metal atoms in the hydride) of 5% to 50% (or 5%-30%) for each metal, such that no one metal dominates the material properties. As with the single metal hydrides, the ratio of hydrogen atoms to (total) metal atoms in the hydride may be between 0.1 and 4, more preferably between 1 and 2.

When considering the possibility of composite materials, the "tungsten carbide and/or boride" materials may be referred to as "absorption layers", and the "metal hydride layers" may be referred to as "moderation layers". Though it will be appreciated that these labels should not be taken as limiting the function of either layer—as depending on the composition some moderation may take place in the absorption layer and vice versa. The labels mainly function to avoid any confusion that might imply that e.g. the tungsten boride layer should be purely tungsten boride.

Figure 3:
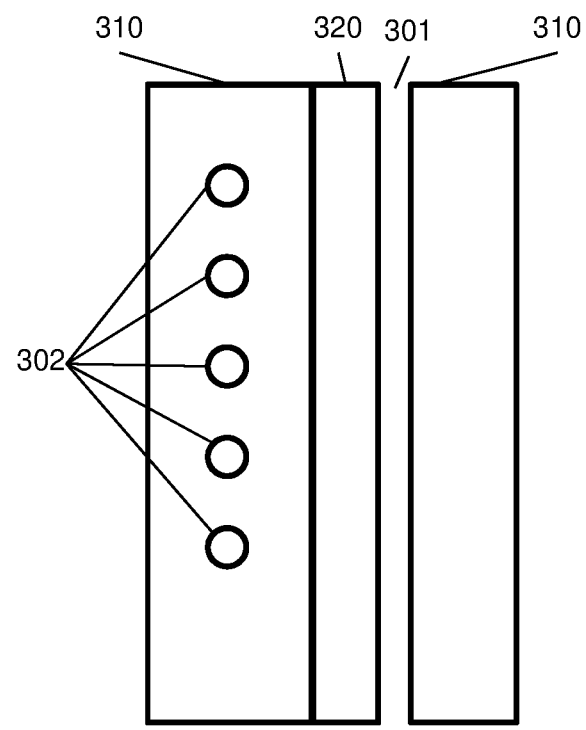
FIG. 3 is a schematic illustration of a further exemplary neutron shield.

The shield may be continuous (as shown in FIG. 2), i.e. with the tungsten boride and metal hydride layers abutting against each other. Alternatively, as shown in FIG. 3, there may be coolant channels 301, 302 or other elements (e.g. temperature, radiation and/or stress sensors) between the tungsten boride 310 and metal hydride 320 layers, or within one or more of the layers. The coolant channels may be configured to carry liquid or gas coolant (water may be used as a coolant, and the shield would still provide a useful alternative to existing designs even though it would not achieve the elimination of water from the shield).

The maximum operating temperature of the shielding will generally be defined by the thermal decomposition temperature of the metal hydride (i.e. the temperature at which the metal hydride will partially decompose and release hydrogen). The actual operating temperature may be slightly higher than the thermal decomposition temperature, as some hydrogen release may be allowed by the reactor safety case. Encapsulation of the metal hydride with stainless steel or similar could be used to prevent hydrogen release to the reactor system. For applications with low or transient neutron load, such as fusion reactors with a pulse length below 10 seconds, direct cooling of the shielding will generally not be required (though may be provided as a precaution). In applications with sustained high neutron load, cooling will be required to keep the shielding below the thermal decomposition temperatures of the metal hydride used. In general, for hafnium hydride and yttrium hydride, the temperature should be kept below about 600° C., for zirconium hydride, the temperature should be kept below about 300° C., and for lithium hydride, the temperature should be kept below about 200° C.

Cooling may be provided by coolant channels within the shielding (as described briefly above), or by thermal conduction to coolant channels outside of the shielding layers.

Figure 4:
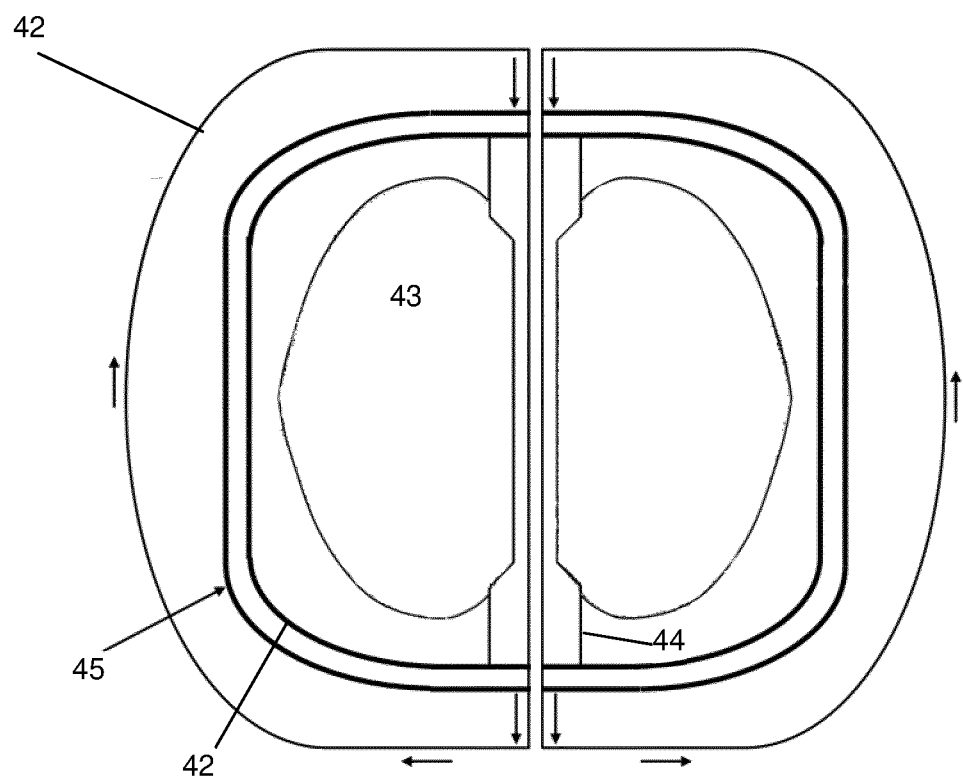
FIG. 4 is a schematic illustration of a tokamak plasma chamber.

FIG. 4 shows a tokamak plasma chamber, for use as a fusion reactor, which comprises a plasma vessel 41 and a magnetic plasma confinement system 42, for confining a plasma 43. The tokamak also comprises neutron shielding 44, 45 located between the plasma vessel and the magnetic plasma confinement system, in both a central column neutron shielding section 44, and an outer shielding section 45.

While the above has been mainly directed to a multi-layer shield, similar principles may be applied to provide a single layer neutron shield comprising metal hydrides. For example, a neutron shield may be provided which comprises a neutron absorbing and moderating material which is a hydride of a metal alloy comprising at least one neutron absorbing element. In the terms of this disclosure, "a neutron absorbing element" has an average neutron absorption cross section which is greater than 0.1 barns at a neutron energy range between 0.02 and 0.03 eV. The "average neutron absorption cross section" is an average of the neutron absorption cross sections in the specified range of all isotopes of that element present (weighted by their abundance). The distribution of isotopes of the neutron absorbing element may be their natural abundance, or it may be some other distribution with the required average neutron absorption cross section. Suitable elements for the alloy are the same as those discussed above for the metal hydride in the multi-layer solution. Suitable neutron absorbing elements include hafnium, tungsten, boron, dysprosium and gadolinium (all of which are suitable at their natural isotopic abundance, but may be used with a different isotopic abundance).

The proportion of the neutron absorbing element may be at least 5 mol %. The ratio of hydrogen to other elements within the material is between 0.1 and 4, more preferably between 1 and 2. The material may be a high entropy alloy comprising at least 5 elements other than hydrogen (at least one of which is a strongly neutron absorbing element), where each of the non-hydrogen elements is between 5 mol. % and <50 mol. % of the alloy (by atomic proportion, excluding hydrogen). The material may be a hydride of the neutron absorbing element.

Such a material may also be used as part of a multi-layer shield, e.g. a shield comprising the neutron absorbing and moderating material in addition to other materials which absorb or moderate neutrons, or a shield comprising the neutron absorbing and moderating material and a cladding or similar protective layer.

The material may be graded, such that its composition varies through its thickness. For example, there may be a greater proportion of neutron absorbing material towards the radially outer surfaces of the neutron shielding, and a greater proportion of hydrogen towards the radially inner surfaces of the neutron shielding.

The invention claimed is:

1. Neutron shielding comprising:
   a plurality of absorption layers, each comprising a tungsten boride or a tungsten carbide; and
   at least one moderating layer comprising a metal hydride;
   wherein each moderating layer is between at least two absorption layers;
   configured such that in use the outermost absorption layer is between the adjacent moderating layer and a neutron source.

2. The neutron shielding according to claim 1, wherein the metal hydride comprises one or more of the metals from groups 4, 5 and 6 from the periodic table and/or yttrium, beryllium, gadolinium, or uranium.

3. The neutron shielding according to claim 2, wherein the metal hydride comprises one or more of hafnium, niobium, tantalum, titanium, yttrium, and zirconium.

4. The neutron shielding according to claim 1, wherein the metal hydride comprises at least 5 metals, each metal having an atomic proportion of 5 mol. % to 50 mol. % compared to the total number of metal atoms in the metal hydride.

5. The neutron shielding according to claim 1, wherein the metal hydride has a ratio of hydrogen atoms to metal atoms between 0.1 and 4, more preferably between 1 and 2.

6. The neutron shielding according to claim 1, wherein each absorption layer comprises an alloy of tungsten metal and tungsten boride and/or tungsten carbide.

7. The neutron shielding according to claim 1, wherein the total thickness of the absorption layers is at least 75% of the total combined thickness of the absorption layers and the at least one moderating layer, more preferably between 80% and 95%.

8. The neutron shielding according to claim 1, wherein the outermost absorption layer has a thickness which is between 30% and 90% of the total combined thickness of the absorption layers and the at least one moderating layer, more preferably between 40% and 80%.

9. The neutron shielding according to claim 8, wherein a further absorption layer which is not the outermost absorption layer has a thickness which is at least 10% of the total combined thickness of the absorption layers and the at least one moderating layer.

10. The neutron shielding according to claim 1, and comprising coolant channels located between the absorption layers and the at least one moderating layer.

11. An assembly comprising neutron shielding according to claim 10, and a coolant source connected to the coolant channels, wherein the coolant source is configured to maintain the neutron shielding at a temperature below a decomposition temperature of the metal hydride.

12. The neutron shielding according to claim 1, and comprising coolant channels integrated within one or more of the absorption layers and/or the at least one moderating layer.

13. A tokamak nuclear fusion reactor comprising:
    a toroidal plasma chamber;
    a plasma confinement system arranged to generate a magnetic field for confining a plasma in an interior of the plasma chamber;
    neutron shielding according to claim 1 arranged between the interior of the toroidal plasma chamber and the plasma confinement system, such that the outermost layer faces the interior of the toroidal plasma chamber.

14. The tokamak nuclear fusion reactor according to claim 13, wherein the neutron shielding comprises coolant channels integrated within one or more of the absorption layers and/or the at least one moderating layer, and comprising a coolant source connected to the coolant channels, wherein the coolant source is configured to maintain the neutron shielding at a temperature below a decomposition temperature of the metal hydride.

* * * * *